UNITED STATES PATENT OFFICE.

ERNEST C. BILTON, OF NEW YORK, N. Y.

COMPOSITION OF MATTER FOR CLEANING.

1,117,767.

Specification of Letters Patent. Patented Nov. 17, 1914.

No Drawing. Application filed June 5, 1914. Serial No. 842,806.

*To all whom it may concern:*

Be it known that I, ERNEST C. BILTON, a citizen of the Dominion of Canada, and a resident of the city of New York, borough of Manhattan, in the county and State of New York, have invented a new and Improved Composition of Matter for Cleaning, of which the following is a full, clear, and exact description.

The object of the invention is to provide a new and improved composition of matter to be used for cleaning and practically renewing articles of marble, granite, onyx, kanestone and other materials and arranged for application to the article as a coating, by the use of a brush or the like, which coating takes up the dirt and other extraneous matter lodged on the surface or in the interstices or pores of the grain of the article, the coating embedding the extraneous matter and in eventually cracking and peeling off, it carries along all extraneous matter.

The composition of matter is in the form of a thick paint and consists of an aggregate and a cleansing agent of a character to keep the composition normally in the form of a thick paint, for applying the composition as a coating to the article to be cleaned, to embed the extraneous matter, the coating after drying being capable of cracking and peeling off from the article.

For the purposes mentioned, the composition consists essentially of flour, salt, bluing, borax soap, washing soda, borax and ammonia.

In order to produce the desired composition, the flour, salt and bluing form one mixture of the composition, and the borax soap, washing soda, borax and ammonia, form another mixture of the composition. The first-named mixture consists of the following ingredients, in about the proportions specified, namely, one pound of pure white pastry flour; one tablespoonful of table salt; and two tablespoonfuls of liquid bluing. These ingredients are mixed and placed in a gallon of water and boiled for about five minutes, until the mass is thoroughly cooked and then the mass is strained to be free of all lumps. The second mixture above named, consists of the following ingredients in about the proportions specified, namely, one pound of bar soap, dissolved in one quart of water; one pound of washing soda, (sal soda) dissolved in one quart of water; one-half pound of borax, dissolved in one pint of water; and one quart of ammonia. The washing soda solution is poured into the borax soap solution, while both are in boiling condition and the resultant solution is thoroughly stirred, and then the borax solution, also in boiling condition is added to the soda and borax soap solution, and both solutions are stirred to insure an intimate mixture. The resultant compound is then poured into a large boiler and sufficient water is added to form a mixture of about five gallons. This mixture is boiled for about thirty minutes and is then allowed to cool gradually, but when still lukewarm, one quart of ammonia is added. From this mixture, a sufficient amount is taken and added to the first-named mixture until the resultant composition is of a consistency of thick paint.

In using the composition, it is applied to the article to be cleaned by the use of a brush, so as to form a coating on the article and this coating is allowed to dry thoroughly and when dry, it begins to crack and peel off the article, or after it is dried, it can be readily wiped off with a piece of cloth or the like. The coating when applied to the article, readily enters all the minute pores and crevices on the surface of the article and takes up the dirt or other extraneous matter and embeds the same while drying. When the coating is finally dry and removed from the article, it carries the extraneous matter with it, thus completely freeing the article of the extraneous matter and without danger of rubbing such extraneous matter into the pores and crevices of the article, as is so frequently the case with the use of ordinary methods of washing and the like now generally practised.

It is understood that the flour of the first solution provides the aggregate and the salt and bluing are used as bleaching agents and, to assist in removing metallic rust, etc. The soap, sal soda, borax and ammonia form the solvents and detergents in liquid form and provide a vehicle to keep the composition normally in the form of thick paint. When the composition is applied in a thin layer on the article it forms a coating for the same and portions of the liquid, especially the ammonia-portion thereof, readily evaporate and allow the composition to dry, crack and peel off.

The composition is very serviceable for cleaning statues, fixtures, walls, floors, stairs, balustrades and interior decorations of marble, granite, onyx, kanestone and other similar natural or artificial stones, whether polished or unpolished.

Having thus described my invention, I claim as new and desire to secure by Letters Patent:

1. The herein described composition normally in the form of a thick paint and to be used for removing dirt and other extraneous matter from articles, consisting of flour, salt, bluing and a composite solvent and detergent of a liquid character to keep the composition normally in the form of a thick paint for applying the composition as a coating to the article to be cleaned to embed the extraneous matter, and to allow the coating to dry, crack and peel off.

2. The herein described composition normally in the form of a thick paint and to be used for removing dirt and other extraneous matter from stone articles, consisting of a flour solution containing bleaching agents, and a solution of borax soap, washing soda, borax and ammonia.

3. The herein described composition normally in the form of a thick paint and to be used for removing dirt and other extraneous matter from stone articles, consisting of a solution of salted flour and bluing and a solution of borax, soap, washing soda, borax and ammonia.

4. The herein described composition normally in the form of a thick paint and to be used for removing dirt and other extraneous matter from stone articles, consisting of flour, salt, bluing, borax soap, washing soda, borax and ammonia in about the proportions specified.

In witness whereof I have signed my name to this specification in the presence of two subscribing witnesses.

ERNEST C. BILTON.

Witnesses:
THEO. G. HOSTER,
EDWARD J. MOUNTAIN.